(12) United States Patent
Fujitani et al.

(10) Patent No.: US 7,687,411 B2
(45) Date of Patent: Mar. 30, 2010

(54) SPEAKER MEMBER AND METHOD FOR MANUFACTURING THE SAME

(75) Inventors: Takeshi Fujitani, Neyagawa (JP); Masahiro Yoshida, Neyagawa (JP)

(73) Assignee: Onkyo Corporation, Osaka (JP)

( * ) Notice: Subject to any disclaimer, the term of this patent is extended or adjusted under 35 U.S.C. 154(b) by 1067 days.

(21) Appl. No.: 11/355,660

(22) Filed: Feb. 16, 2006

(65) Prior Publication Data

US 2006/0281381 A1    Dec. 14, 2006

(30) Foreign Application Priority Data

Jun. 8, 2005   (JP)   .............. 2005-167909
Oct. 31, 2005  (JP)   .............. 2005-315875

(51) Int. Cl.
- B32B 3/20    (2006.01)
- D06P 3/24    (2006.01)
- C08J 5/00    (2006.01)
- C09J 4/00    (2006.01)
- C09K 3/00    (2006.01)
- A47B 81/06   (2006.01)

(52) U.S. Cl. .......... 442/59; 264/331.19; 8/515; 252/182.22; 525/920; 524/379; 524/474; 524/323; 181/199

(58) Field of Classification Search .......... None
See application file for complete search history.

(56) References Cited

U.S. PATENT DOCUMENTS

| | | | | |
|---|---|---|---|---|
| 4,190,746 A | * | 2/1980  | Harwood et al. | 381/427 |
| 4,655,317 A | * | 4/1987  | Kolya et al.   | 181/257 |
| 4,973,364 A | * | 11/1990 | Farrar et al.  | 156/84  |
| 5,162,619 A | * | 11/1992 | Thiele et al.  | 181/166 |
| 5,906,704 A | * | 5/1999  | Matsuura et al.| 156/331.4 |
| 6,148,953 A | * | 11/2000 | Fujitani       | 181/169 |
| 6,218,006 B1 | * | 4/2001 | Tokunaga et al.| 428/355 AC |
| 6,347,683 B2 | * | 2/2002 | Schriever      | 181/167 |
| 6,359,709 B1 | * | 3/2002 | DeCusatis et al.| 398/5  |
| 6,458,724 B1 | * | 10/2002 | Veiga et al.  | 442/76  |
| 6,734,125 B2 | * | 5/2004 | Veiga          | 442/203 |
| 6,740,607 B2 | * | 5/2004 | Veiga et al.   | 442/149 |
| 7,279,532 B2 | * | 10/2007 | Sasagawa et al.| 525/332.9 |

FOREIGN PATENT DOCUMENTS

| | | |
|---|---|---|
| JP | 58009500 A      | 1/1983  |
| JP | (1995) 7-284194 A | 10/1995 |
| JP | 7288894 A       | 10/1995 |
| JP | 8264312 A       | 10/1996 |

* cited by examiner

*Primary Examiner*—David R Sample
*Assistant Examiner*—Nicole T Gugliotta
(74) *Attorney, Agent, or Firm*—The Webb Law Firm

(57) ABSTRACT

The speaker member includes: a base material; and a resin film layer laminated on the base material through an adhesive layer. The adhesive layer has a heat shrinkage ratio of 0.5 to 1.0%; the resin film layer has a heat shrinkage ratio of 0.8 to 1.3%; and the heat shrinkage ratio of the adhesive layer is smaller than the heat shrinkage ratio of the resin film layer. The method of manufacturing a speaker comprises the steps of: applying a predetermined resin composition on a release material; drying the resin composition, so as to form a resin film layer on the release material; applying a predetermined adhesive on the resin film layer, so as to form an adhesive layer; attaching together the resin film layer formed on the release material and a base material through the adhesive layer, so as to form a laminate; subjecting the laminate to aging; and molding the laminate subjected to aging by using a metal mold having a predetermined shape.

17 Claims, 9 Drawing Sheets

SPEAKER MEMBER AND METHOD FOR MANUFACTURING THE SAME

This application claims priority under 35 U.S.C. Section 119 to Japanese Patent Application No. 2005-167909 filed on Jun. 8, 2005, and to Japanese Patent Application No. 2005-315875 filed on Oct. 31, 2005, which are herein incorporated by reference.

1. FIELD OF THE INVENTION

The present invention relates to a speaker member and to a method of manufacturing the same. In particular, the present invention relates to a speaker member, which is light in weight, and has excellent internal loss and strength, stability in qualities such as heat resistance, moist heat resistance, and light resistance, and excellent moldability, and to a simple and inexpensive method of manufacturing the same.

2. DESCRIPTION OF THE RELATED ART

In general, typical examples of a material to be used for a tweeter diaphragm include a metal foil, a polymer film, and a coated fabric. However, those materials each have problems. The metal foil has high rigidity but small internal loss, thereby easily generating sound specific to the metal. As a result, the metal foil provides an insufficient S/N ratio. An engineering plastic film is often used as the polymer film because the engineering plastic has high rigidity than general plastic and is lighter than the metal foil and the coated fabric. The engineering plastic (such as polyetheretherketone (PEEK), thermoplastic polyimide (PI), or polyetherimide (PEI)) film has excellent rigidity and heat resistance, but small internal loss. As a result, the engineering plastic provides a small S/N ratio, thereby only providing speakers with much sound distortion. Further, the engineering plastic generally has a large specific gravity, to thereby cause a problem of reducing sound pressure.

As a method of improving internal loss of a diaphragm obtained from the engineering plastic film, there is proposed a technique of coating a paint containing as a binder a polyester-based resin or an acrylic resin on at least one side of the film. This technique is intended to cause internal friction during vibration owing to the coating. However, this technique not only adds to a problem of reducing sound pressure by further increased weight but also causes a problem of unstable quality due to uneven thickness of the coating.

The coated fabric is typically prepared by impregnating a base material (such as a woven fabric of cotton or synthetic fiber) with a thermosetting resin (such as a phenol resin), and coating an acrylic resin, a urethane resin, or the like on a surface of the base material.

The coated fabric has excellent rigidity and internal loss. However, the coated fabric must be subjected to coating of several layers for preventing breathing, to thereby increase the weight and reduce the sound pressure. In order to solve those problems, there is proposed a diaphragm in which a thermoplastic urethane resin film is laminated on both sides or one side of a base material for weight reduction (JP H07-284194 A, for example). However, a general polyurethane resin contains as a main component a polyester-based or polyether-based resin, and has problems such as progression of hydrolysis by humidity and degradation through oxidation decomposition of a carbon main chain by UV irradiation. Further, the polyether-based resin has a disadvantage of a lower heat decomposition temperature than that of the polyester-based resin, so the polyether-based resin is inferior in heat resistance.

Meanwhile, a method of manufacturing the coated fabric often employs a dry lamination method involving applying a solvent-type adhesive to a base material into an adhesive state, attaching a thermoplastic urethane resin film thereto, and heat sealing the film for lamination. In the case where the dry lamination method is employed and the base material is a woven fabric or non-woven fabric, the solvent-type adhesive seeps out from a back surface of the base material to inhibit adjustment of thickness. As a result, releasability of a speaker member or an edge degrades, thereby causing molding defects. Further, adhesiveness between the base material and the laminate film degrades. In order to improve the adhesiveness, there is also proposed a method of laminating the film at a temperature of a softening point or higher. However, the lamination must be performed at a temperature at which the thermosetting resin impregnated for shaping of the base material is not yet completely cured. Thus, a film having a low softening point, that is, a film with insufficient heat resistance must be used. Further, a large difference in heat shrinkage ratios between the thermoplastic urethane resin film and the adhesive causes a problem of delamination during heating (such as during molding).

There is also proposed a method involving forming a thermoplastic urethane resin film on a release material such as woodfree paper or PPC paper, applying an adhesive thereon, and attaching a fibrous base material thereto through a dry lamination method or a wet lamination method. The dry lamination method requires heat resistance of the film or adhesive because lamination is performed by using heated press rolls. In the wet lamination method, the adhesive may seep out from the back surface of the fibrous base material through the press rolls in the step of attaching the fibrous base material, to thereby possibly cause molding defects.

As described above, there are desired a speaker member which is lightweight, and which has excellent internal loss, stability in qualities such as heat resistance, moist heat resistance, and light resistance, and excellent moldability, and a simple and inexpensive method of manufacturing the same.

SUMMARY OF THE INVENTION

The present invention has been made in view of solving the above-described conventional problems, and an object of the present invention is therefore to provide a speaker member, which is light in weight, and has excellent internal loss and strength, stability in qualities such as heat resistance, moist heat resistance, and light resistance, and excellent moldability, and a simple and inexpensive method of manufacturing the same.

A speaker member according to an embodiment of the present invention includes a base material and a resin film layer laminated on the base material through an adhesive layer. The adhesive layer has a heat shrinkage ratio of 0.5 to 1.0%; the resin film layer has a heat shrinkage ratio of 0.8 to 1.3%; and the heat shrinkage ratio of the adhesive layer is smaller than the heat shrinkage ratio of the resin film layer.

In one embodiment of the invention, the resin film layer is formed of polycarbonate-based polyurethane.

In another embodiment of the invention, the polycarbonate-based polyurethane has a molecular weight of 10,000 or more.

In still another embodiment of the invention, the resin film layer has a thickness of 1 to 40 μm.

In still another embodiment of the invention, the adhesive layer is formed of a polycarbonate-based polyurethane adhesive.

In still another embodiment of the invention, the adhesive layer has a thickness of 10 to 50 μm.

In still another embodiment of the invention, the resin film layer and the adhesive layer are formed of identical resins or similar resins. In still another embodiment of the invention, the resin film layer is formed of polycarbonate-based polyurethane; and the adhesive layer is formed of a polycarbonate-based polyurethane adhesive.

In still another embodiment of the invention, the adhesive layer includes a first adhesive layer and a second adhesive layer in the order given from a side of the base material. The first adhesive layer has a heat shrinkage ratio of 0.5 to 0.8%; the second adhesive layer has a heat shrinkage ratio of 0.6 to 1.0%; the heat shrinkage ratio of the first adhesive layer is smaller than the heat shrinkage ratio of the second adhesive layer; and the heat shrinkage ratio of the second adhesive layer is smaller than the heat shrinkage ratio of the resin film layer.

In still another embodiment of the invention, the first adhesive layer is formed of a polycarbonate-based polyurethane adhesive for dry lamination; and the second adhesive layer is formed of a polycarbonate-based polyurethane adhesive for wet lamination.

In still another embodiment of the invention, the polycarbonate-based polyurethane adhesive for dry lamination contains polycarbonate-based polyurethane having a molecular weight of about 20,000 to 50,000. In still another embodiment of the invention, the polycarbonate-based polyurethane adhesive for wet lamination contains polycarbonate-based polyurethane having a molecular weight of about 50,000 to 100,000.

In still another embodiment of the invention, the first adhesive layer has a thickness of 10 to 50 μm. In still another embodiment of the invention, the second adhesive layer has a thickness of 10 to 50 μm.

In still another embodiment of the invention, the base material is formed of a woven fabric or a non-woven fabric of one fiber selected from the group consisting of a natural fiber, a regenerated fiber, and a synthetic fiber.

According to another aspect of the invention, a method of manufacturing a speaker member is provided. The method includes: applying a predetermined resin composition on a release material; drying the resin composition, so as to form a resin film layer on the release material; applying a predetermined adhesive on the resin film layer, so as to form an adhesive layer; attaching together the resin film layer formed on the release material and a base material through the adhesive layer, so as to form a laminate; subjecting the laminate to aging; and molding the laminate subjected to aging by using a metal mold having a predetermined shape.

In one embodiment of the invention, the adhesive layer has a heat shrinkage ratio of 0.5 to 1.0%; the resin film layer has a heat shrinkage ratio of 0.8 to 1.3%; and the heat shrinkage ratio of the adhesive layer is smaller than the heat shrinkage ratio of the resin film layer.

In another embodiment of the invention, the laminate is subjected to aging in a form of a roll.

According to still another aspect of the invention, a speaker is provided. The speaker includes the above-described speaker member.

According to the present invention, the speaker member includes a base material; and a resin film layer laminated on the base material through an adhesive layer, in which: the adhesive layer and the resin film layer each have a predetermined heat shrinkage ratio; and the heat shrinkage ratio of the adhesive layer is smaller than the heat shrinkage ratio of the resin film layer. Thus, the present invention can provide a speaker member having excellent moist heat resistance, light resistance, and heat resistance. Delamination between the resin film layer and the adhesive layer due to heat hardly occurs in the speaker member of the present invention, to thereby presumably provide such an effect. Further, in an embodiment where polycarbonate-based polyurethane is used for the adhesive layer, seepage of the adhesive from the back surface of the base material may be suppressed. Thus, when the speaker member or an edge is molded into a predetermined shape, releasability of the speaker or the edge is favorable.

DESCRIPTION OF THE PREFERRED EMBODIMENTS

Figure 1:
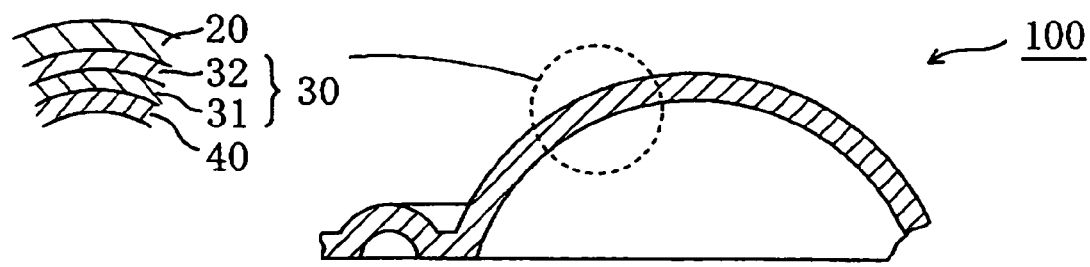
FIG. 1 is a schematic sectional view of a speaker member according to a preferred embodiment of the present invention.

A speaker member of the present invention includes: a base material; and a resin film layer laminated on the base material through an adhesive layer, in which: the adhesive layer has a heat shrinkage ratio of 0.5 to 1.0%; the resin film layer has a heat shrinkage ratio of 0.8 to 1.3%; and the heat shrinkage ratio of the adhesive layer is smaller than the heat shrinkage ratio of the resin film layer. FIG. 1 is a schematic sectional view of a speaker member according to a preferred embodiment of the present invention. A speaker member 100 includes a resin film layer 20, an adhesive layer 30, and a base material 40 in the order given from a side of sound radiation. The adhesive layer 30 may be formed of a mono layer, or may have a laminate structure as shown in FIG. 1 (details described below).

A. Resin Film Layer

The resin film layer has a heat shrinkage ratio of 0.8 to 1.3% as described above, and preferably 0.9 to 1.2%. The resin film layer having a heat shrinkage ratio within a predetermined range allows suppression of delamination (that is, peeling between the resin film layer and the adhesive layer) due to heat applied in a drying step or a molding step.

A resin forming the resin film layer is preferably polyurethane, more preferably polycarbonate-based polyurethane. The polycarbonate-based polyurethane is composed of, for example, polycarbonate, an isocyanate compound, and a chain extender.

Any appropriate polycarbonate is employed as the polycarbonate. Polycarbonate diol is preferred. The use of the polycarbonate diol can provide a speaker member having excellent heat resistance and humidity resistance. Examples of the polycarbonate diol include polyethylene carbonate diol, polybutylene carbonate diol, and polyhexamethylene carbonate diol.

Any appropriate isocyanate compound is employed as the isocyanate compound. A diisocyanate compound is preferred. Specific examples of the diisocyanate compound include aliphatic diisocyanate, alicyclic diisocyanate, and aromatic diisocyanate. Aliphatic diisocyanate or alicyclic diisocyanate is preferred. The use of those isocyanate compounds can provide a speaker member having excellent light resistance. Further, a speaker member having excellent moldability can be provided, due to good reactivity of those isocyanate compounds with the polycarbonate.

Any appropriate low molecular weight compound having active hydrogen is employed as the chain extender. Diol or diamine is preferred. Specific examples of the chain extender include 2-methylpropane diol, pentanediol, ethylenediamine, and propylenediamine.

Any appropriate method may be employed as a method of producing the polycarbonate-based polyurethane. Specific examples thereof include: (a) a method of producing polyurethane by mixing polycarbonate and a chain extender containing an active hydrogen atom, heating the mixture to 40 to 100° C., adding an isocyanate compound in an amount such that a molar ratio between the active hydrogen atom in the mixture and the isocyanate group is 1:1 to 1:1.5, stirring the whole for a short period of time, and heating the whole to for example 50 to 160° C.; (b) a method of producing polyurethane by kneading a mixture of polycarbonate, a chain extender containing an active hydrogen atom, and an isocyanate compound at high temperatures of for example 180 to 260° C.; (c) a method of producing polyurethane by continuously supplying polycarbonate, a chain extender containing an active hydrogen atom, an isocyanate compound, and the like to an extruder such as a multi-screw extruder for continuous melt polymerization at high temperatures of for example 180 to 260° C.; and (d) a method of producing polyurethane by performing a polyurethane forming reaction in an organic solvent by using polycarbonate, a chain extender containing an active hydrogen atom, and an isocyanate compound.

Polycarbonate-based polyurethane to be used for the resin film layer may have any appropriate molecular weight in accordance with the purpose. The molecular weight is preferably 10,000 or more, and more preferably 20,000 to 300,000. A molecular weight of 10,000 or less may cause difficulties in forming of the resin film, and a film to be obtained often has insufficient mechanical properties. In contrast, a molecular weight of 300,000 or more increases a viscosity of the resin and often causes difficulties in forming of a uniform film.

The resin film layer may have any appropriate thickness in accordance with the purpose. For example, in the case where the resin film layer is formed through a method of applying and drying a resin solution, the resin film layer has a thickness of preferably 1 to 40 μm, and more preferably 10 to 30 μm.

B. Adhesive Layer

The adhesive layer 30 is arranged between the base material 40 and the resin film layer 20. As described above, the adhesive layer 30 may be formed of a monolayer or may have a laminate structure as shown in FIG. 1. Hereinafter, the adhesive layer of each case will be described.

B-1. Adhesive Layer Formed of Monolayer:

The adhesive layer has a heat shrinkage ratio of 0.5 to 1.0%, and more preferably 0.6 to 0.9%. The heat shrinkage ratio of the adhesive layer is smaller than the heat shrinkage ratio of the resin film layer. The heat shrinkage ratios adjusted in such a relationship and a total heat shrinkage ratio set within a predetermined range inhibit delamination between the resin film layer and the adhesive layer due to heat. Further, curling caused by heat generated during a step of drying a laminated plate or molding a speaker member can be suppressed. The thickness of the adhesive layer is designed appropriately in accordance with the purpose. The adhesive layer has a thickness of preferably 10 to 50 μm, and more preferably 20 to 40 μm.

A resin forming the adhesive layer is preferably an identical or similar resin to the resin forming the resin film layer. The phrase "similar resin" in the specification of the present invention refers to a resin having similar chemical properties or physical properties (heat shrinkage ratio, in particular), for example. An identical or similar resin is used, to thereby prevent delamination between the resin film and the adhesive layer due to different heat shrinkage ratios. The resin forming the adhesive layer is more preferably a polyurethane resin, and particularly preferably a polycarbonate-based polyurethane resin. Details of the polycarbonate-based polyurethane resin are described in the above section A.

B-2. Adhesive Layer Having Laminate Structure:

The adhesive layer may have a laminate structure. For example, as shown in FIG. 1, the adhesive layer may include a first adhesive layer 31 and a second adhesive layer 32 in the order given from a side of the base material. The adhesive layer having a laminate structure has larger adhesive strength than that of the adhesive layer formed of a monolayer, and can further suppress seepage of the adhesive from a back surface of the base material. Further, a heat shrinkage ratio of a speaker member can be gradually controlled in a thickness direction, to thereby allow suppression of curling of the laminate due to temperature change (for example, in a drying step). In addition, the first adhesive layer (preferably, an adhesive layer for dry lamination), and the second adhesive layer (preferably, an adhesive layer for wet lamination) are laminated in the order given from the side of the base material, to thereby facilitate formation of an adhesive layer having a desired heat shrinkage ratio distribution in a thickness direction and allow suppression of seepage of the adhesive from the back surface of the base material.

The first adhesive layer has a heat shrinkage ratio of preferably 0.5 to 0.8%, and more preferably 0.6 to 0.7%. Meanwhile, the second adhesive layer has a heat shrinkage ratio of 0.6 to 1.0%, and more preferably 0.7 to 0.9%.

Preferably, the heat shrinkage ratio of the first adhesive layer is smaller than the heat shrinkage ratio of the second adhesive layer, and the heat shrinkage ratio of the second adhesive layer is smaller than the heat shrinkage ratio of the resin film layer. The heat shrinkage ratios adjusted in such a relationship and a total heat shrinkage ratio set within a predetermined range inhibit delamination between the resin film layer and the adhesive layer due to heat. Further, curling caused by heat generated during, for example, a step of drying a laminated plate or molding a speaker member can be suppressed.

The resins forming the first adhesive layer and the second adhesive layer are preferably resins similar to each other, and are preferably identical or similar resins to the resin forming the resin film layer. A specific example thereof includes a polyurethane resin (preferably a polycarbonate-based polyurethane resin). More preferably, the first adhesive layer is formed of a polycarbonate-based polyurethane adhesive for dry lamination, and the second adhesive layer is formed of a polycarbonate-based polyurethane adhesive for wet lamination. The adhesive layer including two layers can suppress seepage of the adhesive from the back surface of the base material.

The polycarbonate-based polyurethane adhesive for dry lamination is an adhesive used by drying and then allowing to bond. The polycarbonate-based polyurethane adhesive for dry lamination may contain a silane coupling agent, a titanate-based coupling agent, or an aluminum-based coupling agent, a defoaming agent, a thickener, a curing agent, and the like. Further, a crosslinking agent and/or across linking accelerating agent may be added. The molecular weight of polycarbonate-based polyurethane in the polycarbonate-based polyurethane adhesive for dry lamination may be designed appropriately in accordance with the purpose and is preferably about 20,000 to 50,000.

Meanwhile, the polycarbonate-based polyurethane adhesive for wet lamination is an adhesive used by bonding while a solvent remains (that is, in a wet state). The molecular weight of polycarbonate-based polyurethane in the polycarbonate-based polyurethane adhesive for wet lamination may be designed appropriately in accordance with the purpose and is preferably about 50,000 to 100,000. The molecular weight of the adhesive for wet lamination is higher than the molecular weight of the adhesive for dry lamination such that the adhesive for dry lamination having a low viscosity reacts with polycarbonate-based polyurethane in the adhesive for wet lamination in a wet state, to thereby increase a viscosity of the entire adhesive layer. Increased viscosity of the adhesive layer can suppress seepage of the adhesive from the back surface of the base material. Thus, when the speaker member or an edge is molded into a predetermined shape, releasability of the speaker member or the edge is favorable.

The thickness of the first adhesive layer or the second adhesive layer may be designed appropriately in accordance with the purpose. The first adhesive layer has a thickness of preferably 10 to 50 µm, and more preferably 20 to 40 µm. Meanwhile, the second adhesive layer has a thickness of preferably 10 to 50 µm, and more preferably 20 to 40 µm.

C. Base Material

The base material may be selected appropriately in accordance with the purpose. The base material is preferably formed of a woven fabric or a non-woven fabric. The base material may be formed of a monolayer of the woven fabric or the non-woven fabric, or may be formed of a laminate of the woven fabric and/or the non-woven fabric.

In the case where the base material is formed of a woven fabric, the woven fabric may have any appropriate weave structure (such as plain weave, twill weave, satin weave, or combination thereof). The woven fabric preferably has a plain weave structure because of excellent mechanical properties in a fiber axis direction of the woven fabric, to thereby provide excellent rigidity. A surface density of the woven fabric having a plain weave structure may be selected appropriately in accordance with properties of the fiber to be used (such as mechanical properties, fiber width, and fiber length), and the like and is typically 60 to 300 g/m$^2$ because a surface density within the above range provides a large effect of increasing strength and excellent moldability. Such a surface density includes a weave density of length 97 threads/inch×width 97 threads/inch, for example.

In the case where the base material is formed of a non-woven fabric, the non-woven fabric may be formed through any appropriate method. Typical examples of the method of forming a non-woven fabric include: wet formation method using a fluid such as water; and a dry formation method in which a short fiber is mechanically and randomly entangled. The wet formation method is preferred because anisotropy in mechanical properties can be suppressed and a non-woven fabric having favorable moldability can be obtained. A surface density (mass per unit area) of the non-woven fabric may vary depending on the purpose and is typically 30 to 150 g/m$^2$.

A fiber forming the woven fabric or the non-woven fabric to be used for the base material may be formed of a long fiber or a short fiber. A fiber forming the woven fabric or the non-woven fabric maybe formed of any appropriate fiber. Preferred examples thereof include a synthetic fiber, a natural fiber, and a regenerated fiber. Specific examples of the synthetic fiber include polyester, polyamide, polyacrylonitrile, polyolefin, and polyvinyl alcohol. Specific examples of the natural fiber include cotton and hemp. Specific examples of the regenerated fiber include rayon and acetate. The fiber is preferably a polyester fiber. The polyester fiber has excellent mechanical properties, dimensional stability, durability, heat resistance, and the like, and thus heat shrinkage is hardly caused. As a result, curling of the speaker member due to heat can be suppressed.

D. Method of Manufacturing Speaker Member

Figure 2:
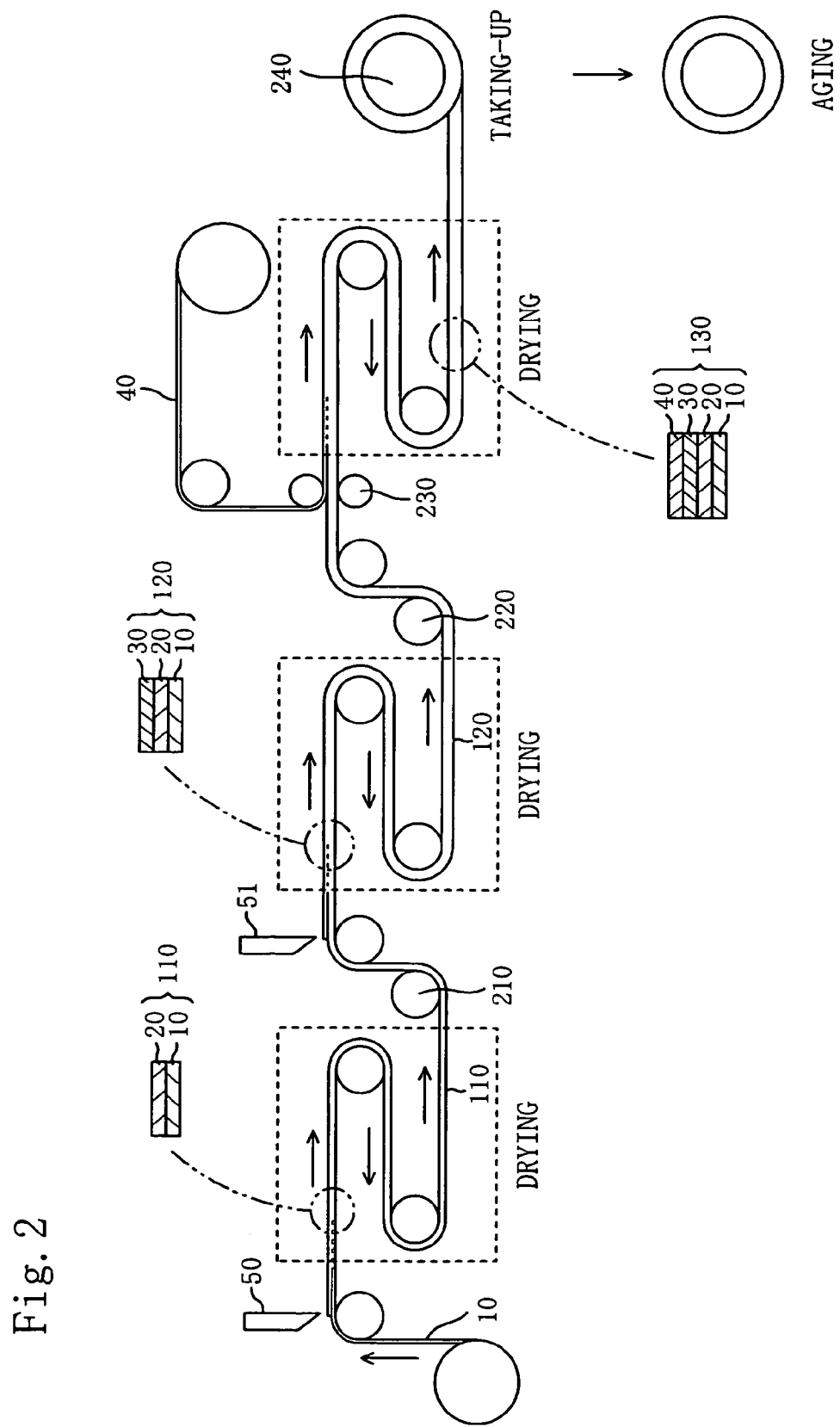
FIG. 2 is a schematic diagram showing an overview of steps of an example of a method of manufacturing a speaker member according to the present invention.

Next, a preferred example of a method of manufacturing a speaker member of the present invention will be described. FIG. 2 shows a method of manufacturing a speaker member including an adhesive layer formed of a monolayer. Note that reference numerals 210, 220, 230, and 240 represent rolls for taking-up respective laminates. First, on a release material 10 such as woodfree paper or PPC paper with a flat surface, a resin film layer forming solution and/or dispersion containing 10 to 30% of a solid content is applied, to thereby obtain a laminate 110 (release material 10/resin film layer 20). The resin film layer forming solution as used herein refers to a solution prepared by dissolving the resin (preferably, a polycarbonate-based polyurethane resin) described in the above section A into any appropriate solvent. The resin film layer forming dispersion as used herein refers to a dispersion prepared by dispersing the resin (preferably, a polycarbonate-based polyurethane resin) described in the above section A in any appropriate dispersion medium. The resin film layer forming solution and dispersion each preferably contain 10 to 30% of the resin (solid content) described in the above section A. Various additives and the like may be added to those solution and dispersion as required. Further, those solution and dispersion may be used in combination as required. Any appropriate method may be employed as a method of applying the resin film layer forming solution and/or dispersion, and examples thereof include a doctor method, a spray method, and a transfer method. Any appropriate application device maybe selected, and examples thereof include a doctor knife coater, a comma coater, and a roll coater. In the case where the doctor knife coater is used, a doctor knife 50 serves to even out the thickness of the laminate 110 and flatten its surface thereof. A clearance between the doctor knife 50 and the laminate 110 may be designed appropriately in accordance with the thickness of the target resin film layer and is 0.1 to 1.5 mm, for example. The laminate 110 is delivered in a direction of an arrow, and is dried at any appropriate temperature in accordance with the purpose. A drying temperature is preferably 50 to 100° C. Any appropriate drying time is also employed in accordance with the purpose and is preferably 5 to 15 minutes.

Next, an adhesive composition (preferably, a polycarbonate-based polyurethane adhesive) forming the adhesive layer 30 is applied on a side of the resin film layer 20 of the laminate 110. Any appropriate application method or application device may be employed. In the case where the doctor method and the doctor knife coater are used, a clearance between a doctor knife 51 and a laminate 120 may be designed appropriately in accordance with the thickness of the target adhesive layer and is 0.1 to 1.5 mm, for example. The obtained laminate 120 (release material 10/resin film layer 20/adhesive layer 30) is delivered in a direction of an arrow, and is dried at any appropriate temperature in accordance with the purpose. The drying temperature is preferably 50 to 100° C. Any appropriate drying time is also employed in accordance with the purpose and is preferably 5 to 15 minutes. A drying step is completed, to thereby form the adhesive layer 30 in the laminate 120. The adhesive layer at this time may be in any appropriate state (such as a dry, semi-wet, or wet state) in accordance with the purpose. The adhesive layer is preferably in a semi-wet state. The adhesive layer formed of a monolayer in a semi-wet state provides a moderate viscosity, to thereby suppress seepage of the adhesive from the back surface of the base material and provide favorable moldability.

Then, any appropriate base material 40 is attached to a side of the adhesive layer 30 of the laminate 120 by using press rolls 230. An attaching pressure may be designed appropriately in accordance with the purpose and is preferably 3 to 6 kg/cm². An attaching temperature may also be designed appropriately in accordance with the purpose and is preferably 100° C. or lower, and more preferably 50° C. or lower. The laminate 120 is delivered in a direction of an arrow, and is dried at any appropriate temperature in accordance with the purpose. The drying temperature is preferably 50 to 100° C. Any appropriate drying time is also employed in accordance with the purpose and is preferably 2 to 10 minutes.

Next, a laminate 130 (release material 10/resin film layer 20/adhesive layer 30/base material 40) is taken-up by a roll 240. A take-up speed may be selected appropriately in accordance with the purpose and is preferably substantially equal to a speed of the press rolls, to thereby prevent stretching of the laminate 130 during take-up. The taken-up laminate 130 is subjected to aging (reactive curing) of the adhesive within any appropriate temperature range in accordance with the purpose. The aging temperature is preferably 50 to 60° C. Any appropriate aging time may be employed in accordance with the purpose and is preferably 60 hours or more, and more preferably 72 hours or more. An aging time of less than 60 hours provides insufficient curing of the adhesive and delamination between the resin film layer and the base material may occur during removal of the release paper and molding of the speaker member. In contrast, the aging time is preferably 120 hours or less because aging for a longer period of time provides no different effects and such aging is useless in consideration of production efficiency. The adhesive layer 30 is cured, and then the release material 10 is removed.

A speaker member is molded, from the laminate with the release material 10 peeled off, by using a metal mold having a predetermined shape in which a dome part and an edge part are integrated. Any appropriate metal mold temperature may be employed in accordance with the purpose. The metal mold temperature on a side of the base material is preferably 200 to 250° C. The metal mold temperature on a side of the resin film is preferably 170 to 210° C. A press pressure of the metal mold may be designed appropriately in accordance with the purpose and is preferably 0.8 to 2.5 kg/cm². Any appropriate press time may be employed in accordance with the purpose and is preferably 5 to 25 seconds.

Figure 3:
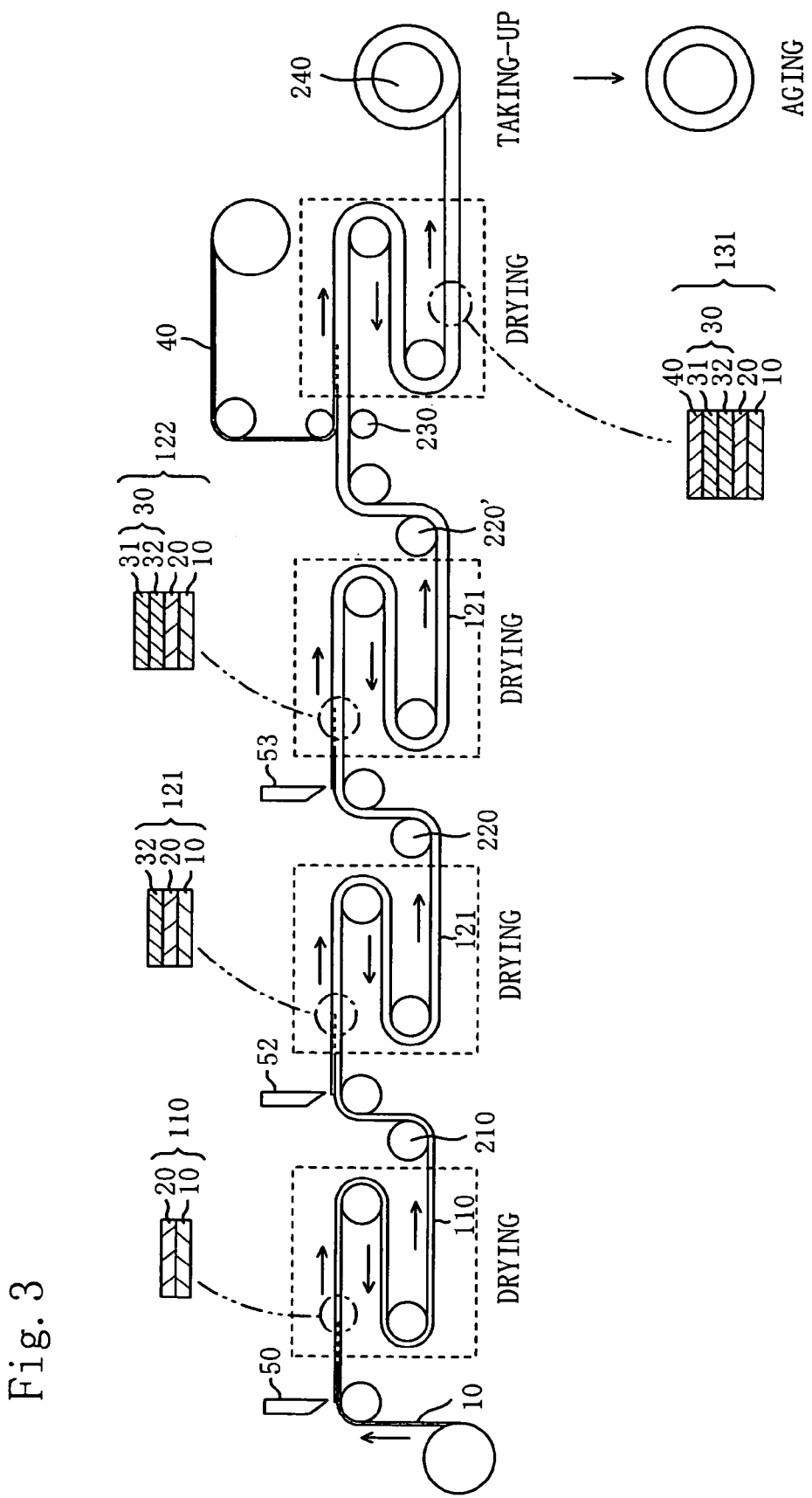
FIG. 3 is a schematic diagram showing an overview of steps of another example of the method of manufacturing a speaker member according to the present invention.

Meanwhile, in the case where the adhesive layer has a laminate structure, a method of laminating adhesive layers as shown in FIG. 3 can be employed. On the side of the resin film layer 20 of the laminate 110 (release material 10/resin film layer 20) obtained in the same manner as described above, an adhesive composition (preferably, a polycarbonate-based polyurethane adhesive for wet lamination) forming the second adhesive layer 32 as in the step described above is applied, to thereby obtain a laminate 121 (release material 10/resin film layer 20/second adhesive layer 32). The laminate 121 is delivered in a direction of an arrow, and is dried at any appropriate temperature in accordance with the purpose. The drying temperature is preferably 50 to 100° C. Any appropriate drying time is also employed in accordance with the purpose and is preferably 5 to 15 minutes. Next, on a side of the second adhesive layer 32 of the laminate 121, an adhesive composition (preferably, a polycarbonate-based polyurethane adhesive for dry lamination) forming the first adhesive layer 31 is applied. The first adhesive layer 31 is formed in the same manner as for the second adhesive layer 32, to thereby obtain a laminate 122 (release material 10/resin film layer 20/second adhesive layer 32/first adhesive layer 31). The subsequent steps are performed in the same manner as in the case shown in FIG. 2, to thereby obtain a laminate 131 (release material 10/resin film layer 20/second adhesive layer 32/first adhesive layer 31/base material 40). The subsequent steps are performed in the same manner as described above, to thereby mold a speaker member.

As described above, the speaker member of the present invention is obtained.

Hereinafter, the present invention will be described more specifically by using examples, but the present invention is not limited to those examples.

EXAMPLE 1 a. Formation of Resin Film Layer

On a release material with a flat surface, a polycarbonate-based urethane resin solution (20% solid content) was applied by using a doctor knife coater (clearance with a doctor knife blade of 0.1 mm) such that a thickness after drying was 20 μm. The laminate was dried under heating at 80° C. for 10 minutes, to thereby obtain a polycarbonate-based urethane resin film (heat shrinkage ratio of 0.8 to 1.3%).

b. Formation of Adhesive Layer

On the polycarbonate-based urethane resin film obtained in the step described above, a polycarbonate-based urethane adhesive was applied by using a doctor knife coater (clearance with a doctor knife blade of 0.1 mm) such that a thickness after drying was 30 μm. The whole was dried under heating at 80° C. for 10 minutes, to thereby form a semi-wet adhesive layer (heat shrinkage ratio of 0.5 to 1.0%).

c. Lamination of Base Material

To the laminate having the adhesive layer formed thereon, a woven fabric of a polyester fiber (surface density of 70 g/m², fiber count of 75×75D, and weave density of 97 threads/inch× 97 threads/inch) was attached by using press rolls (attaching pressure of 4 kg/cm² ) at normal temperatures. The whole was dried under heating at 80° C. for 5 minutes and was taken-up by using a roll.

d. Molding of Speaker Member

The taken-up laminate was subjected to aging at 50° C. for 72 hours or more, to thereby reactively cure the adhesive. Then, the laminate having the release material peeled off was molded into a speaker member by using a metal mold (voice coil diameter of Φ25) in which a dome part and an edge part are integrated and under the conditions of a metal mold temperature on a side of the base material of 230° C., a metal mold temperature on a side of the urethane resin film of 190° C., a press pressure of 1.0 kg/cm², and a press time of 18 seconds.

Figure 4A:
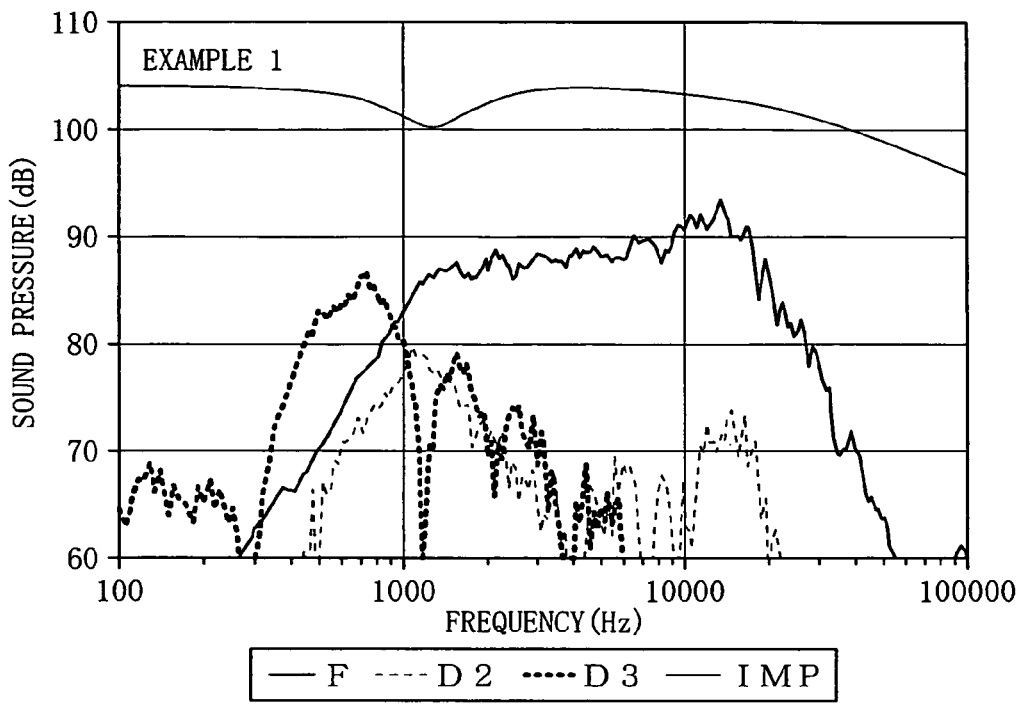
FIG. 4A is a graph showing frequency characteristics in Example 1.
Figure 5:
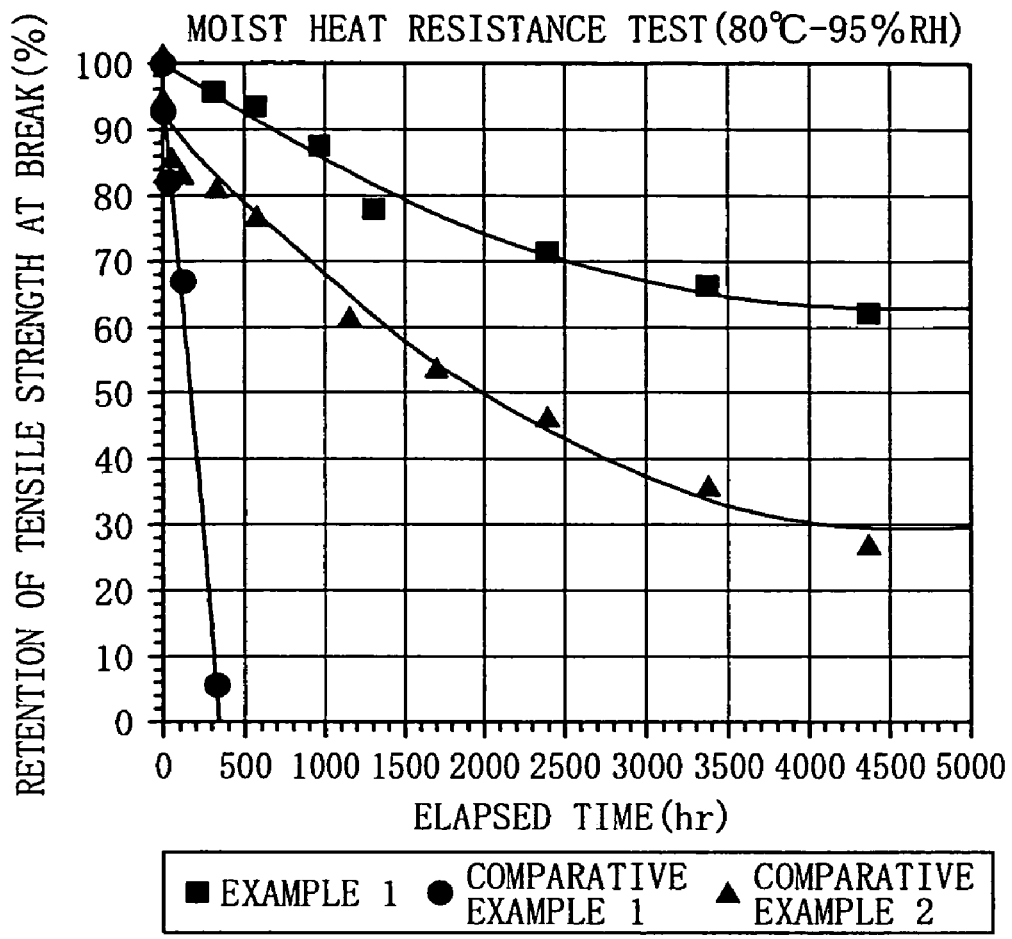
FIG. 5 is a graph showing a comparison in results of a moist heat-resistance degradation test in Example 1 and Comparative Examples 1 and 2.
Figure 6:
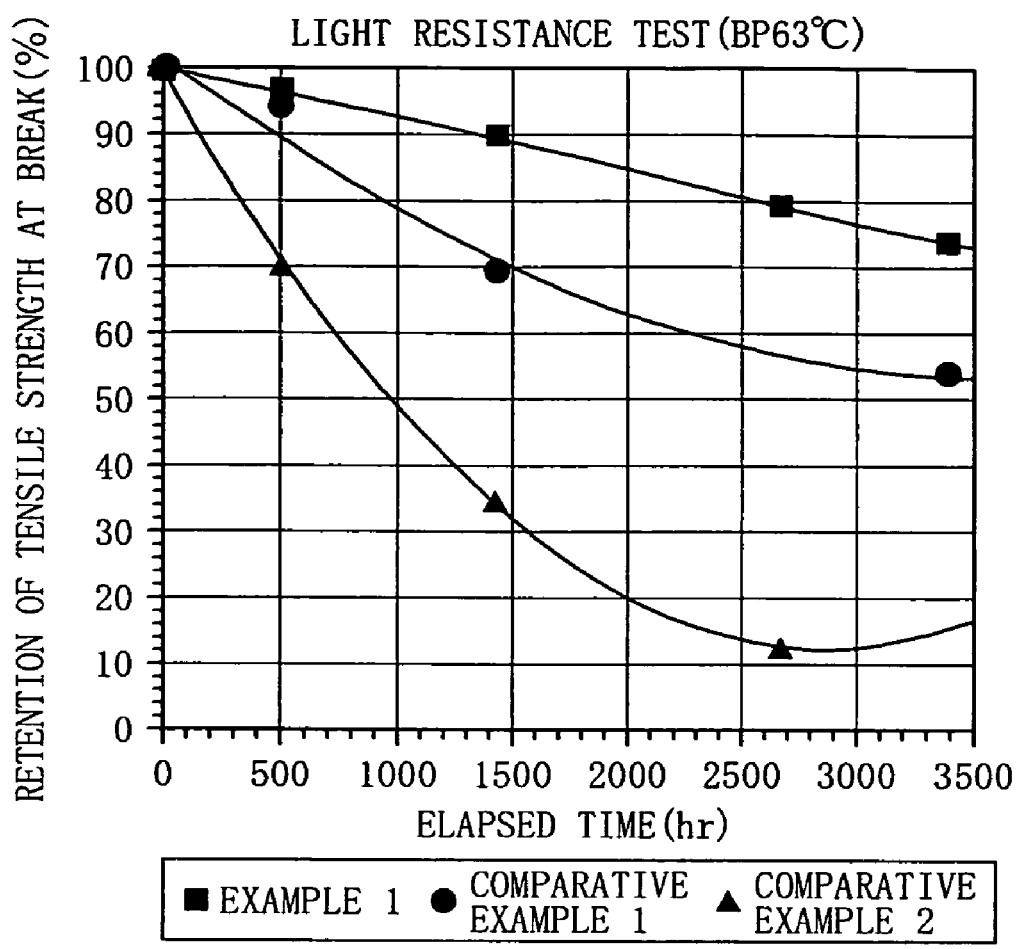
FIG. 6 is a graph showing a comparison in results of a light-resistance degradation test in Example 1 and Comparative Examples 1 and 2.
Figure 7:
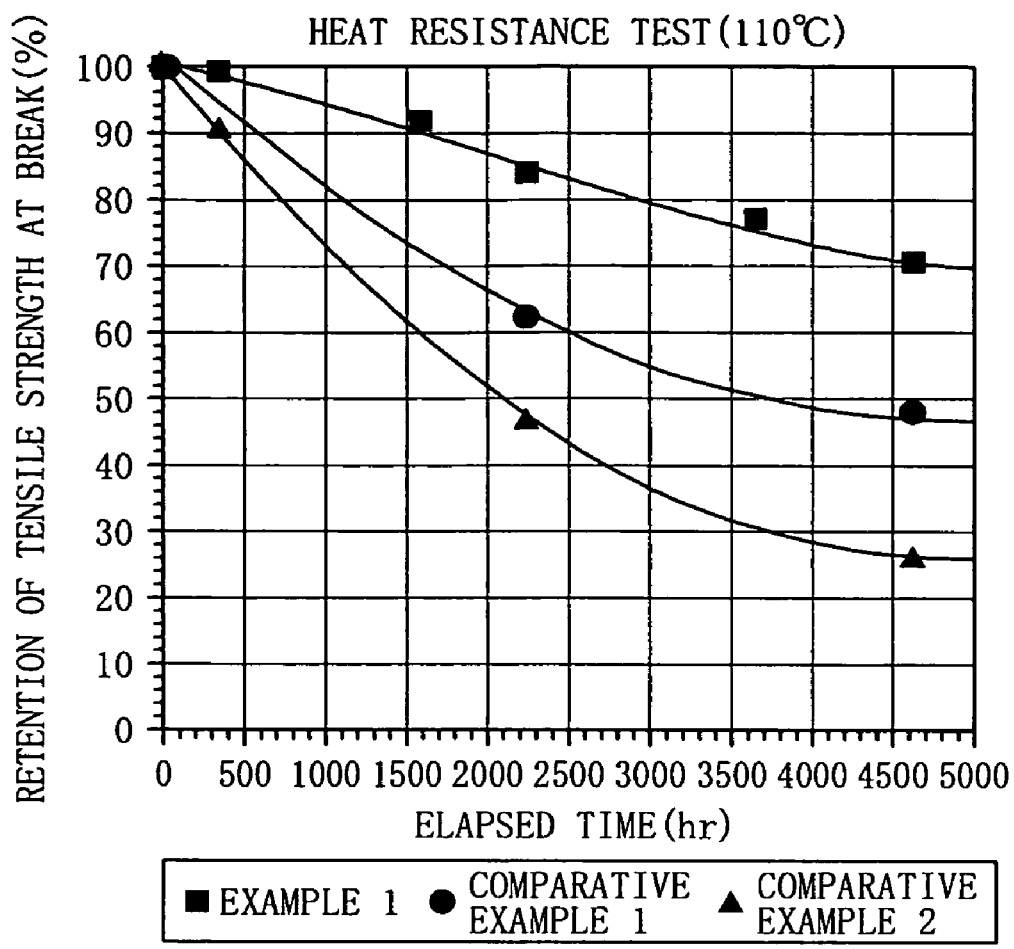
FIG. 7 is a graph showing a comparison in results of a heat-resistance degradation test in Example 1 and Comparative Examples 1 and 2.

Frequency characteristics of the obtained speaker member were measured. FIG. 4A shows the result. A moist heat-resistance degradation test was performed by measuring change in retention of tensile strength at break under the conditions of 80° C. and 95% RH. FIG. 5 collectively shows the results of Example 1 and Comparative Examples 1 and 2 described below. A light-resistance degradation test was performed by using a xenon fade meter and measuring change in retention of tensile strength at break in an environment of BP 63° C. FIG. 6 collectively shows the results of Example 1 and Comparative Examples 1 and 2 described below. Heat-resistance degradation test was performed by measuring change in retention of tensile strength at break at 110° C. FIG. 7 collectively shows the results of Example 1 and Comparative Examples 1 and 2 described below.

COMPARATIVE EXAMPLE 1

Figure 4B:
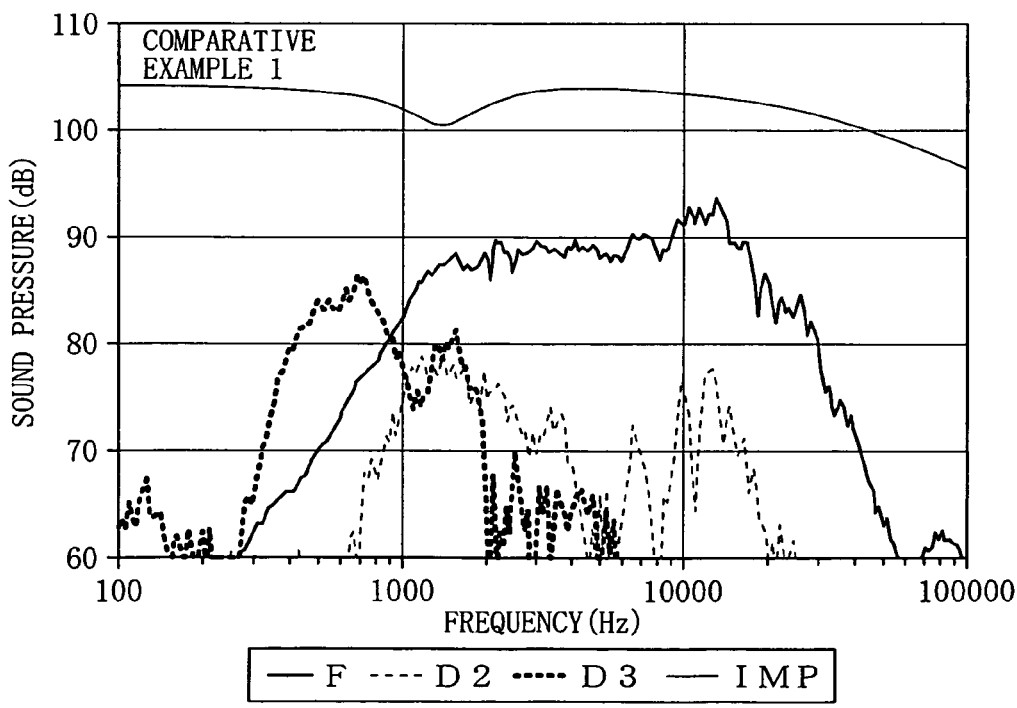
FIG. 4B is a graph showing frequency characteristics in Comparative Example 1.

A speaker member was molded in the same manner as in Example 1 except that a polyester-based urethane resin was used for the resin film layer. The obtained speaker member was subjected to evaluation of its properties in the same manner as in Example 1. The tests were performed in the same manner as in Example 1. FIG. 4B shows the frequency characteristics, and FIG. 5 shows the results of the moist heat-resistance degradation test. FIG. 6 shows the results of the light-resistance degradation test, and FIG. 7 shows the results of the heat-resistance degradation test.

COMPARATIVE EXAMPLE 2

A speaker member was molded in the same manner as in Example 1 except that a polyether-based urethane resin was used for the resin film layer. The obtained speaker member was subjected to evaluation of its properties in the same manner as in Example 1. The obtained speaker member was subjected to the moist heat-resistance degradation test, the light-resistance degradation test, and the heat-resistance degradation test in the same manner as in Example 1. FIG. 5 shows the results of the moist heat-resistance degradation test, and FIG. 6 shows the results of the light-resistance degradation test. FIG. 7 shows the results of the heat-resistance degradation test.

EXAMPLE 2

Figure 8:
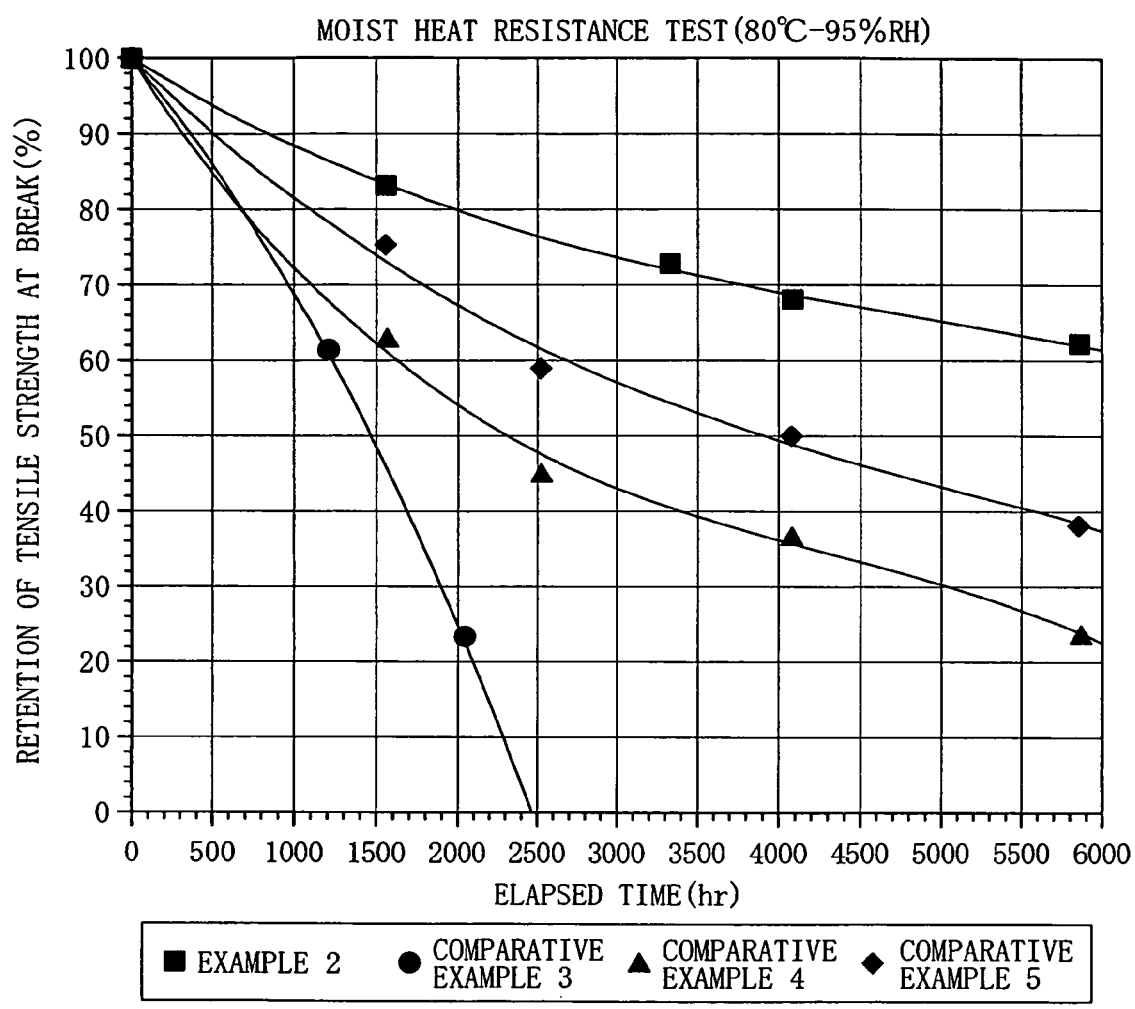
FIG. 8 is a graph showing a comparison in results of a moist heat-resistance degradation test in Example 2 and Comparative Examples 3, 4, and 5.
Figure 9:
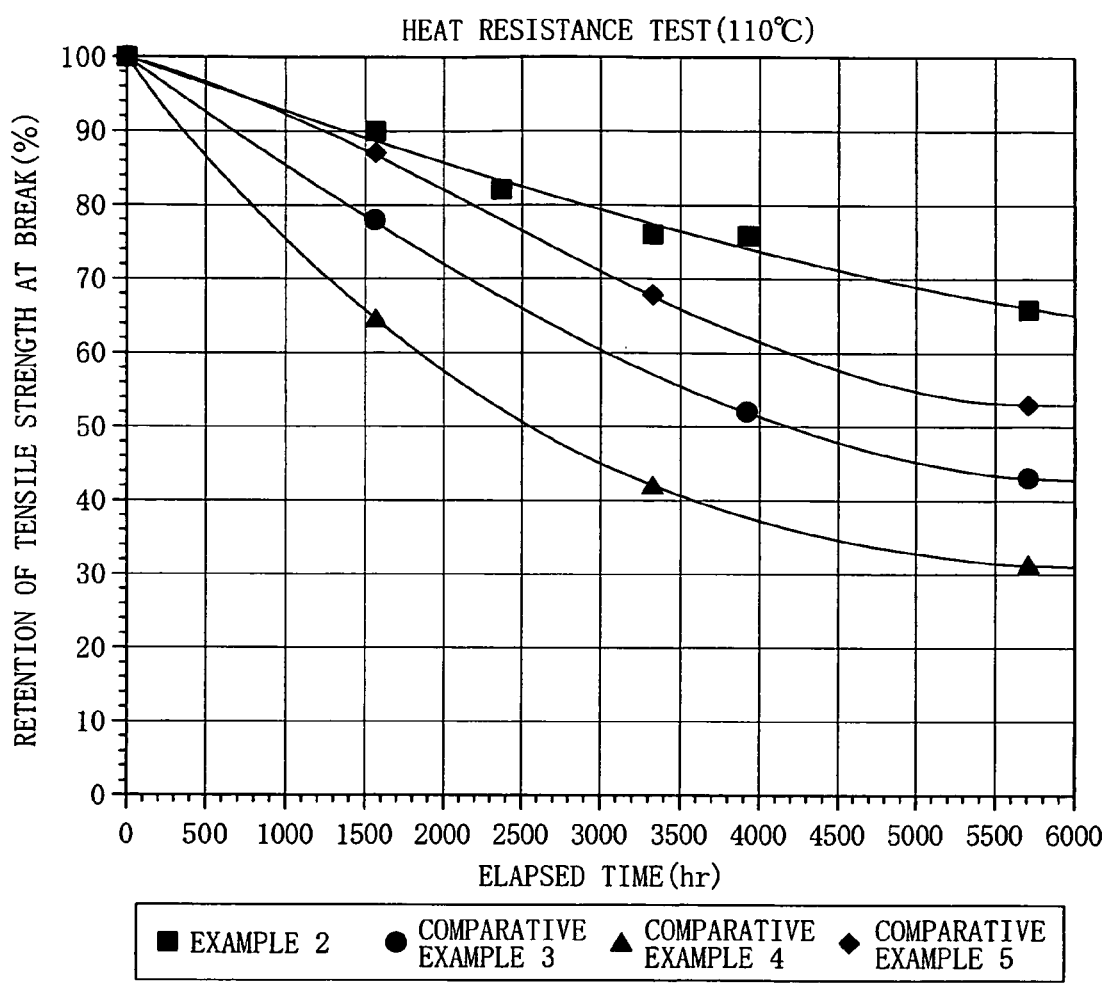
FIG. 9 is a graph showing a comparison in results of a heat-resistance degradation test in Example 2 and Comparative Examples 3, 4, and 5.

On the urethane resin film layer obtained in Example 1, a polycarbonate-based urethane adhesive for wet lamination (molecular weight of about 50,000 to 100,000) was applied by using a doctor knife coater (clearance with a doctor knife blade of 0.1 mm) such that a thickness after drying was 30 μm. Then, the whole was dried under heating at 80° C. for 10 minutes, to thereby form a second adhesive layer (heat shrinkage ratio of 0.6 to 1.0%) in a wet state. Further, a polycarbonate-based urethane adhesive for dry lamination (molecular weight of about 20,000 to 50,000) was applied thereon by using a doctor knife coater (clearance with a doctor knife blade of 0.1 mm) such that a thickness after drying was 30 μm. The whole was dried under heating at 80° C for 10 minutes, to thereby form a first adhesive layer (heat shrinkage ratio of 0.5 to 0.8%). A speaker member was molded in the same manner as in Example 1 except that those adhesive layers were used. The obtained speaker member was subjected to the moist heat-resistance degradation test and the heat-resistance degradation test in the same manner as in Example 1. FIG. 8 shows the results of the moist heat-resistance degradation test, and FIG. 9 shows the results of the heat-resistance degradation test.

COMPARATIVE EXAMPLE 3

A speaker member was molded in the same manner as in Example 2 except that a polyester-based urethane resin was used for the resin film layer. The obtained speaker member was subjected to the moist heat-resistance degradation test and the heat-resistance degradation test in the same manner as in Example 1. FIG. 8 shows the results of the moist heat-resistance degradation test, and FIG. 9 shows the results of the heat-resistance degradation test.

COMPARATIVE EXAMPLE 4

A speaker member was molded in the same manner as in Example 2 except that a polyether-based urethane resin was used for the resin film layer. The obtained speaker member was subjected to the moist heat-resistance degradation test and the heat-resistance degradation test in the same manner as in Example 1. FIG. 8 shows the results of the moist heat-resistance degradation test, and FIG. 9 shows the results of the heat-resistance degradation test.

COMPARATIVE EXAMPLE 5

On the urethane resin film layer obtained in Example 1, a polyester-based urethane adhesive was applied by using a doctor knife coater (clearance with a doctor knife blade of 0.1 mm) such that a thickness after drying was 30 μm. The whole was dried under heating at 80° C. for 10 minutes, to thereby form an adhesive layer. Then, a base material was laminated and a speaker member was molded in the same manner as in Example 1. The obtained speaker member was subjected to the moist heat-resistance degradation test and the heat-resistance degradation test in the same manner as in Example 1. FIG. 8 shows the results of the moist heat-resistance degradation test, and FIG. 9 shows the results of the heat-resistance degradation test.

FIGS. 4A and 4B reveal that the speaker members each employing the polycarbonate-based urethane resin for the resin film layer have suppressed sound distortion at high frequencies compared with those of Comparative Examples. FIGS. 5 to 7 reveal that speaker members each having excellent moist heat resistance, light resistance, and heat resistance can be obtained by using the polycarbonate-based urethane resin for the resin film layer. FIGS. 8 and 9 reveal that speaker members each having excellent moist heat resistance and heat resistance can be obtained by using the polycarbonate-based urethane resins for the resin film layer and the adhesive layer. Further, the results of Example 2 and Comparative Example 5 reveal that speaker members each having excellent moist heat resistance and heat resistance can be obtained by using identical (similar) resins for the resin film layer and the adhesive layer. As described above, the present invention can provide a speaker member which is light in weight, and has excellent internal loss and strength, stability in qualities such as moist heat resistance, light resistance, and heat resistance, and excellent moldability, and a simple and inexpensive method of manufacturing the same.

The speaker member of the present invention can suitably be used for any appropriate speaker (tweeter, in particular).

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A speaker member comprising:
    a base material; and
    a resin film layer laminated on the base material through an adhesive layer, wherein:
        the adhesive layer has a heat shrinkage ratio of 0.5 to 1.0%;
        the resin film layer has a heat shrinkage ratio of 0.8 to 1.3%; and
        the heat shrinkage ratio of the adhesive layer is smaller than the heat shrinkage ratio of the resin film layer.

2. A speaker member according to claim 1, wherein the resin film layer is formed of polycarbonate-based polyurethane.

3. A speaker member according to claim 2, wherein the polycarbonate-based polyurethane has a molecular weight of 10,000 or more.

4. A speaker member according to claim 1, wherein the resin film layer has a thickness of 1 to 40 μm.

5. A speaker member according to claim 1, wherein the adhesive layer is formed of a polycarbonate-based polyurethane adhesive.

6. A speaker member according to claim 1, wherein the adhesive layer has a thickness of 10 to 50 μm.

7. A speaker member according to claim 1, wherein:
    the adhesive layer comprises a first adhesive layer and a second adhesive layer in the order given from a side of the base material; the first adhesive layer has a heat shrinkage ratio of 0.5 to 0.9%;
    the second adhesive layer has a heat shrinkage ratio of 0.6 to 1.0%;
    the heat shrinkage ratio of the first adhesive layer is smaller than the heat shrinkage ratio of the second adhesive layer; and
    the heat shrinkage ratio of the second adhesive layer is smaller than the heat shrinkage ratio of the resin film layer.

8. A speaker member according to claim 7, wherein:
    the first adhesive layer is formed of a polycarbonate-based polyurethane adhesive for dry lamination; and
    the second adhesive layer is formed of a polycarbonate-based polyurethane adhesive for wet lamination.

9. A speaker member according to claim 8, wherein the polycarbonate-based polyurethane adhesive for dry lamination contains polycarbonate-based polyurethane having a molecular weight of about 20,000 to 50,000.

10. A speaker member according to claim 8, wherein the polycarbonate-based polyurethane adhesive for wet lamination contains polycarbonate-based polyurethane having a molecular weight of about 50,000 to 100,000.

11. A speaker member according to claim 7, wherein the first adhesive layer has a thickness of 10 to 50 μm.

12. A speaker member according to claim 7, wherein the second adhesive layer has a thickness of 10 to 50 μm.

13. A speaker member according to claim 11, wherein the second adhesive layer has a thickness of 10 to 50 μm.

14. A speaker member according to claim 1, wherein the base material is formed of one of a woven fabric and anon-woven fabric of one fiber selected from the group consisting of a natural fiber, a regenerated fiber, and a synthetic fiber.

15. A method of manufacturing a speaker member comprising:
    applying a predetermined resin composition on a release material;
    drying the resin composition, so as to form a resin film layer on the release material;
    applying a predetermined adhesive on the resin film layer, so as to form an adhesive layer;
    attaching together the resin film layer formed on the release material and a base material through the adhesive layer, so as to form a laminate;
    subjecting the laminate to aging; and
    molding the laminate subjected to aging by using a metal mold having a predetermined shape; wherein
    the adhesive layer has a heat shrinkage ratio of 0.5 to 1.0%;
    the resin film layer has a heat shrinkage ratio of 0.8 to 1.3%; and
    the heat shrinkage ratio of the adhesive layer is smaller than the heat shrinkage ratio of the resin film layer.

16. A method of manufacturing a speaker member according to claim 15, wherein the laminate is subjected to aging in a form of a roll.

17. A speaker comprising the speaker member according to claim 1.

* * * * *